United States Patent
Natsumeda et al.

(10) Patent No.: US 11,398,760 B2
(45) Date of Patent: Jul. 26, 2022

(54) STATOR, STATOR ASSEMBLY, AND TRANSDUCER FOR CONVERTING BETWEEN ELECTRICAL ENERGY AND MECHANICAL ENERGY

(71) Applicant: Murata Manufacturing Co., Ltd., Nagaokakyo (JP)

(72) Inventors: Mitsutoshi Natsumeda, Nagaokakyo (JP); Hisato Amano, Nagaokakyo (JP); Takashi Sakurada, Nagaokakyo (JP); Eiji Sakaguchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 144 days.

(21) Appl. No.: 16/801,636

(22) Filed: Feb. 26, 2020

(65) Prior Publication Data
US 2020/0280236 A1 Sep. 3, 2020

(30) Foreign Application Priority Data

Feb. 28, 2019 (JP) .............................. JP2019-036202
Dec. 6, 2019 (JP) .............................. JP2019-221128

(51) Int. Cl.
*H02K 3/52* (2006.01)

(52) U.S. Cl.
CPC ......... *H02K 3/522* (2013.01); *H02K 2203/09* (2013.01)

(58) Field of Classification Search
CPC .................................................... H02K 3/522
See application file for complete search history.

(56) References Cited

U.S. PATENT DOCUMENTS

| | | | | |
|---|---|---|---|---|
| 7,126,246 B2 * | 10/2006 | Izumi | ...................... | H02K 3/18 310/208 |
| 7,385,323 B2 * | 6/2008 | Takahashi | ................ | H02K 3/38 310/194 |
| 7,626,303 B2 * | 12/2009 | Watanabe | .............. | H02K 3/522 310/194 |
| 8,487,501 B2 * | 7/2013 | Oka | ........................ | H02K 3/345 310/215 |

(Continued)

FOREIGN PATENT DOCUMENTS

| | | |
|---|---|---|
| EP | 2063516 A2 | 5/2009 |
| JP | 2013090420 A | 5/2013 |

(Continued)

OTHER PUBLICATIONS

Chinese Office Action issued for corresponding Chinese Patent Application No. 202010115723.1, dated Dec. 21, 2021.

*Primary Examiner* — Robert W Horn
(74) *Attorney, Agent, or Firm* — ArentFox Schiff LLP

(57) ABSTRACT

A stator member includes a stator core, a coil, and an insulator. The stator core has a shape extending in an axial direction, and has a side surface parallel to the axial direction. The coil has a linear shape and is wound around the side surface of the stator core. The coil has a coil end portion 231 at one end of the coil having the linear shape, and a coil end portion 232 at another end of the coil having the linear shape. The insulator has insulation properties, and is provided with an outer member. The outer member has a first recess and a second recess extending in a thickness direction. The coil end portion 231 is inserted into the first recess. The coil end portion 232 is inserted into the second recess.

12 Claims, 12 Drawing Sheets

(56) References Cited

U.S. PATENT DOCUMENTS

| | | | | |
|---|---|---|---|---|
| 8,853,910 | B2* | 10/2014 | Sato | H02K 15/095 |
| | | | | 310/194 |
| 8,963,389 | B2* | 2/2015 | Kim | H01R 39/383 |
| | | | | 310/71 |
| 9,024,500 | B2* | 5/2015 | Kimura | H02K 3/522 |
| | | | | 310/194 |
| 9,748,812 | B2* | 8/2017 | Kim | H02K 1/14 |
| 10,063,118 | B2* | 8/2018 | Yoshida | H02K 3/48 |
| 10,411,529 | B2* | 9/2019 | Matsumoto | H02K 3/18 |
| 10,700,565 | B2* | 6/2020 | Wust | H02K 15/085 |
| 10,700,566 | B2* | 6/2020 | Kato | H02K 3/345 |
| 10,971,963 | B2* | 4/2021 | Reu | H02K 3/18 |
| 11,043,869 | B2* | 6/2021 | Hsu | H02K 15/12 |
| 11,063,482 | B2* | 7/2021 | Kazama | H02K 1/148 |
| 2007/0278869 | A1* | 12/2007 | Taketsuna | H02K 9/19 |
| | | | | 310/54 |
| 2007/0279178 | A1* | 12/2007 | Zimmer | H02K 3/522 |
| | | | | 336/208 |
| 2012/0286619 | A1* | 11/2012 | Tsuiki | H02K 3/522 |
| | | | | 310/215 |
| 2012/0299410 | A1* | 11/2012 | Yoshida | H02K 3/522 |
| | | | | 310/71 |
| 2015/0054377 | A1 | 2/2015 | Kameyama et al. | |
| 2015/0333590 | A1 | 11/2015 | Yoshida et al. | |
| 2020/0059129 | A1* | 2/2020 | Yamashita | H02K 15/095 |
| 2020/0195096 | A1* | 6/2020 | Loesch | H02K 1/12 |
| 2020/0198780 | A1* | 6/2020 | Huang | B64C 27/10 |
| 2020/0280236 | A1* | 9/2020 | Natsumeda | H02K 3/522 |
| 2020/0381984 | A1* | 12/2020 | Sercombe | H02P 6/10 |
| 2021/0111593 | A1* | 4/2021 | Pan | H02K 1/16 |
| 2021/0143698 | A1* | 5/2021 | Alsman | H02K 3/38 |
| 2021/0143702 | A1* | 5/2021 | Uchise | H02K 1/146 |
| 2021/0175767 | A1* | 6/2021 | Lee | H02K 5/225 |
| 2021/0194311 | A1* | 6/2021 | Kim | H02K 7/003 |

FOREIGN PATENT DOCUMENTS

| | | |
|---|---|---|
| JP | 2013247698 A | 12/2013 |
| JP | 2016013053 A | 1/2016 |
| WO | 2013157101 A1 | 10/2013 |
| WO | 2014122762 A1 | 8/2014 |

* cited by examiner

STATOR, STATOR ASSEMBLY, AND TRANSDUCER FOR CONVERTING BETWEEN ELECTRICAL ENERGY AND MECHANICAL ENERGY

CROSS REFERENCE TO RELATED APPLICATIONS

This application claims priority to Japanese Patent Application No. 2019-036202, filed Feb. 28, 2019, and Japanese Patent Application No. 2019-221128, filed Dec. 6, 2019, the entire contents of each of which are hereby incorporated in their entirety.

TECHNICAL FIELD

Aspect of the present invention relates to a stator, a stator assembly including the stator, and a transducer for converting between electrical energy and mechanical energy.

BACKGROUND OF THE INVENTION

Japanese Unexamined Patent Application Publication No. 2016-13053 discloses a motor. The motor disclosed in the Japanese Unexamined Patent Application Publication No. 2016-13053 includes a stator core and a busbar. The stator core is made of a plurality of teeth, where a winding wire is wound around each tooth. The plurality of teeth are arranged at equal intervals in a circumferential direction.

The busbar is adjacent to the stator core in an axial direction of the motor. The busbar is provided with an annular base portion and a connection portion connected to the base portion. The connection portion protrudes to an opposite side to a side on which the stator core is disposed, with respect to the base portion. The connection portion has two opposing flat plates.

When the winding of the tooth and the busbar are connected to each other, an operator draws part of the winding formed in a loop shape to an outside, and inserts the part between the two flat plates of the connection portion. Then, the operator performs welding or the like in a state in which the drawn part of the winding is sandwiched between the two flat plates of the connection portion.

However, the motor structure of Japanese Unexamined Patent Application Publication No. 2016-13053, has a positional relationship between the winding of the tooth and the connection portion of the busbar that is not always constant.

Thus, joining of the winding of the stator and the connection portion of the busbar is not easy nor consistent.

SUMMARY OF THE INVENTION

Accordingly, it is an object of the present invention to provide a stator a having structure which facilitates the connection between a coil and a busbar of a stator, a stator assembly using the stator, and a transducer for converting between electrical energy and mechanical energy.

According to aspects of the disclosure of the present invention, the stator includes a stator core, an insulator, and a coil. The stator core may have a shape extending along an axial direction, and have a side surface extending in the axial direction. The insulator may have insulation properties, and may be disposed on the side surface of the stator core. The coil may have a linear shape, and may be wound around the side surface of the stator core with the insulator interposed therebetween. The coil may have a first coil end portion at one end of the coil having the linear shape, and a second coil end portion at another end of the coil having the linear shape. The insulator may include a central member covering the side surface of the stator core, and an outer member connected to an outside in an axial direction of the central member. The outer member may have, with a direction in which the central member and the outer member are arranged being a thickness direction, a first recess and a second recess extending in the thickness direction. The first coil end portion may be inserted into the first recess, and the second coil end portion may be inserted into the second recess.

In this configuration, the first coil end portion may be guided in a desired direction by the first recess, and the second coil end portion may be guided in a desired direction by the second recess. Thus, the first coil end portion and the second coil end portion may be reliably guided to respective positions where connection to the busbar is easy.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a preferred mode of use, further features and advances thereof, will be understood by reference to the following detailed description of illustrative implementations of the disclosure when read in conjunction with reference to the accompanying drawings, wherein.

DETAILED DESCRIPTION

A stator (also referred to interchangeably herein as a "stator member"), a stator assembly (also referred to interchangeably herein as a "stator ass'y"), and a motor according to an embodiment of the present disclosure will be described with reference to the drawings.

Figure 1:
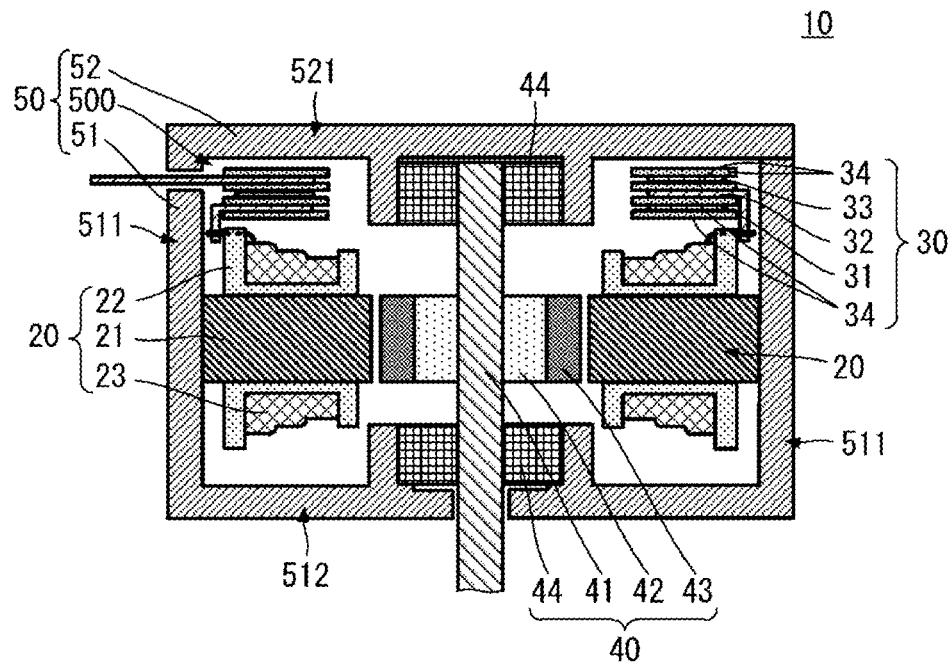
FIG. 1 is a cross-sectional view illustrating a schematic configuration of a motor in accordance with aspects of the present disclosure.
Figure 2:
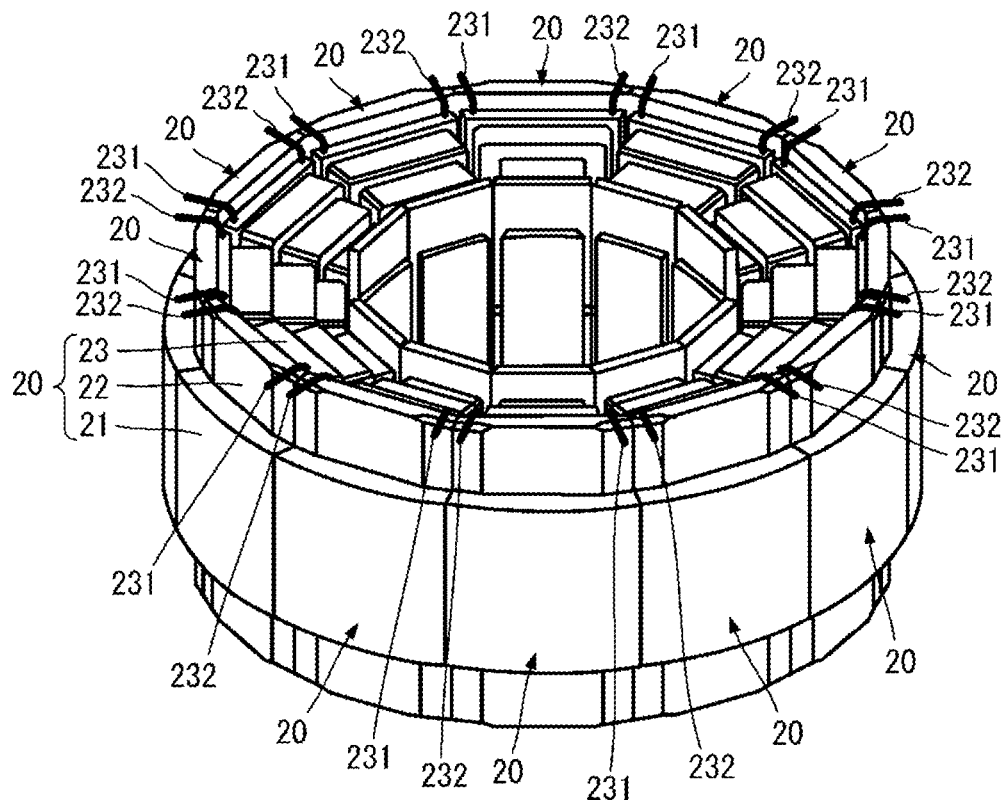
FIG. 2 is a perspective view of a stator assembly in accordance with aspects of the present disclosure.

FIG. 1 is a cross-sectional view illustrating a schematic configuration of the motor according to an aspect of the disclosure. FIG. 2 is a perspective view of the stator assembly. The motor is described as a transducer for converting between electrical energy and mechanical energy, but a generator may also be used. For example, the transducer for converting between electrical energy and mechanical energy may be a transducer converting from electrical energy to mechanical energy, or a transducer converting from mechanical energy to electrical energy.

As illustrated in FIG. 1, a motor 10 includes stator members 20, a busbar member 30, a rotor member 40, and a housing 50. A plurality of the stator members 20 are illustrated. As described above, the stator member 20 corresponds to the "stator" of the present disclosure.

The housing 50 is illustrated with a first member 51 and a second member 52. The first member 51 may have a first wall 511 defined with a cylindrical shape, and a planar second wall 512 that closes one end of the cylindrical shape. The first member 51 may have a substantially cylindrical box shape having an opening. The second member 52 may have a substantially plate-like shape, and may have a planar third wall 521. The second member 52 may be disposed so as to close the opening of the first member 51. Thus, the housing 50 may have a space 500 which is substantially shielded from an outside by the first wall 511, the second wall 512, and the third wall 521. The first member 51 and the second member 52 may be constructed with a material having high rigidity.

The stator members 20, the busbar member 30, and the rotor member 40 may be disposed in the space 500 formed by the housing 50. The rotor member 40 may be disposed at a substantially central position in plan view of the third wall 521 and the second wall 512. For example, the rotor member 40 may be disposed in a central region of a predetermined size, including a central axis of a substantially cylindrical shape formed by the first wall 511. In one aspect of the disclosure, an axial direction of the rotor member 40 coincide with, or parallel to, an axial direction of the substantially cylindrical shape that is a shape of the stator assembly formed by the plurality of stator members 20.

As illustrated in FIG. 1, the plurality of stator members 20 are disposed between the substantially cylindrical first wall 511 of the housing 50 and the rotor member 40. As illustrated in FIG. 2, the stator members 20 are disposed at equal distances, along a circumferential direction of the cylindrical shape. For example, the plurality of stator members 20 are disposed such that the rotor member 40 may be disposed at a center in a cylindrical opening formed by the plurality of stator members 20, and that an axis of the rotor member 40 may be orthogonal to an opening surface. The stator members 20 may be proximate to each other. The stator assembly is constituted by the stator members 20 arranged circumferentially in this way.

As illustrated in FIG. 1, the busbar member 30 is disposed so as to be adjacent to the plurality of stator members 20 in an axial direction of the housing 50. The busbar member 30 may be connected to the stator member 20 by a connection pattern, as described below. The busbar member 30 may be provided with a busbar output terminal. Part of the busbar output terminal may be exposed outside the housing 50.

Although not illustrated in the figures, an insulating resin may be formed between the plurality of stator members 20 and the first wall 511. Thermal conductivity of the resin may be higher than that of air. Accordingly, heat dissipation performance of the motor 10 may be improved. Further, the insulating resin may also be formed on a portion of the plurality of stator member 20 excluding a side facing the rotor member 40.

The rotor member 40 may include a shaft 41, a rotor yoke 42, a magnet 43, and bearings 44. The shaft 41 may be rod-shaped and constructed with a high rigidity. A direction in which an axis of the shaft 41 extends (axial direction) is parallel to the axial direction of the housing 50. The shaft 41 may be installed in the housing 50 with the bearings 44 interposed therebetween. The rotor yoke 42 may be disposed on an outer main surface of the shaft 41. The magnet 43 may be disposed on an outer main surface of the rotor yoke 42.

Figure 3A:
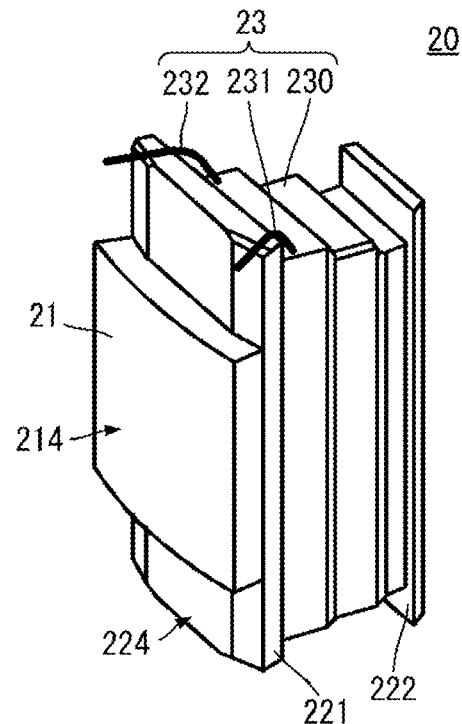
FIG. 3A is a perspective view of a stator member in accordance with aspects of the present disclosure.
Figure 3B:
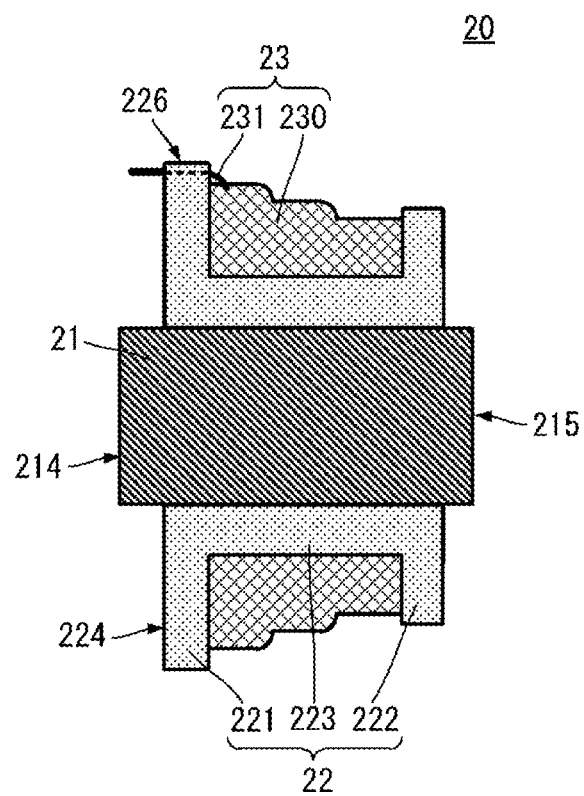
FIG. 3B is a cross-sectional view illustrating a schematic configuration of the stator member in accordance with aspects of the present disclosure.
Figure 4A:
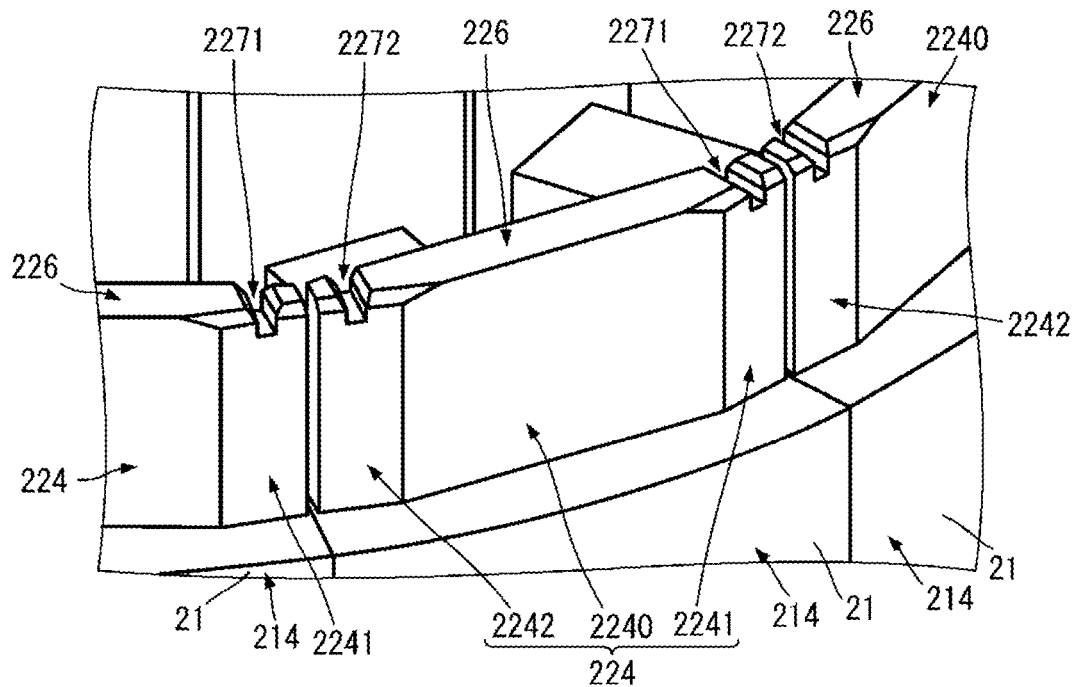
FIG. 4A is a partial enlarged view of an insulator in accordance with aspects of the present disclosure.
Figure 4B:
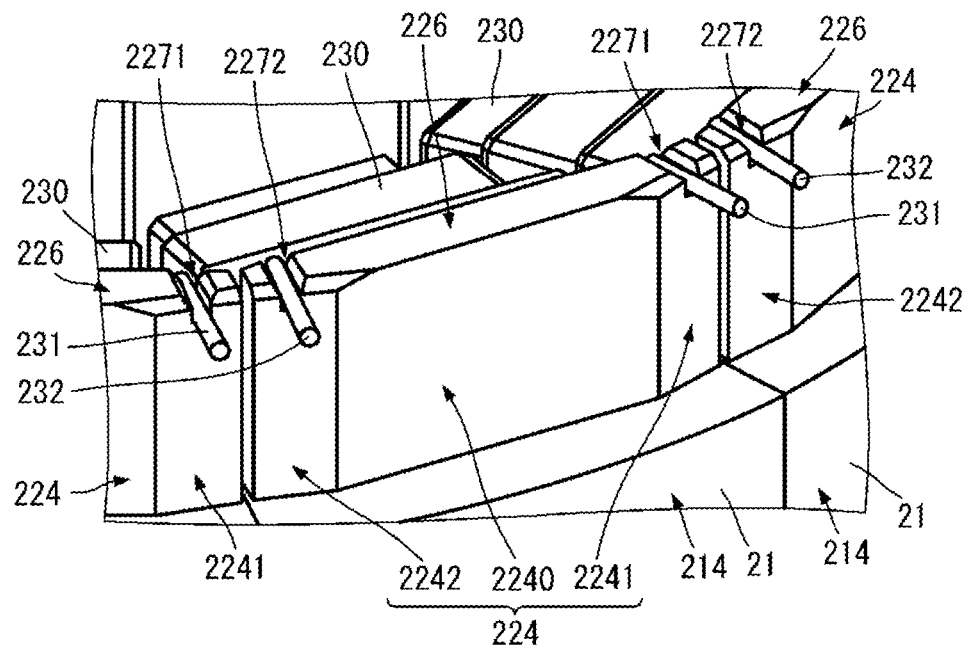
FIG. 4B is a partial enlarged view of an insulator in accordance with aspects of the present disclosure.
Figure 5A:
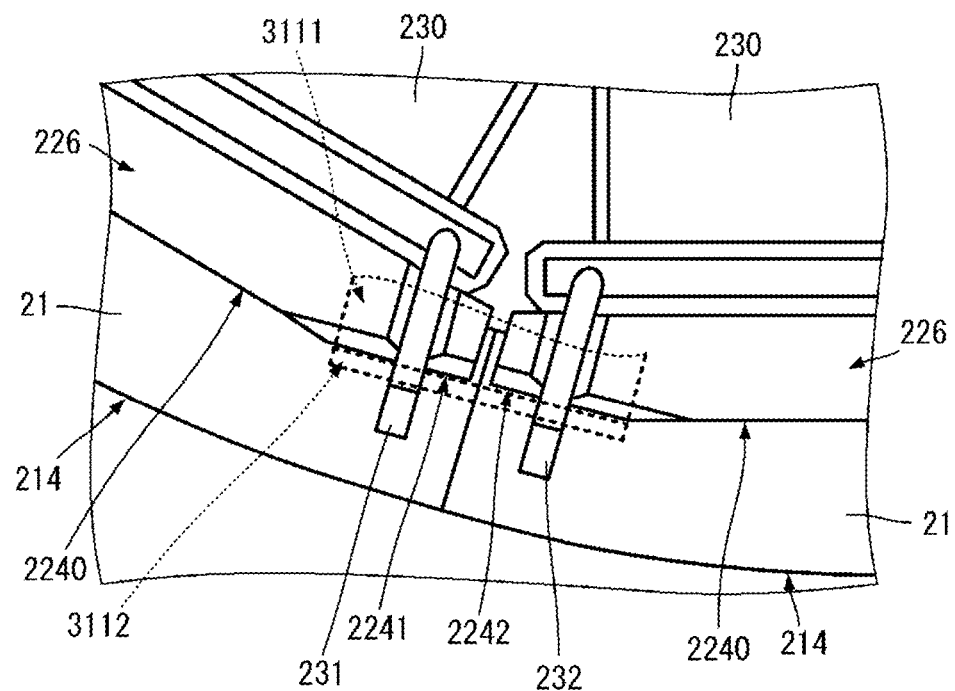
FIG. 5A is a partial enlarged view of the stator assembly in accordance with aspects of the present disclosure.
Figure 5B:
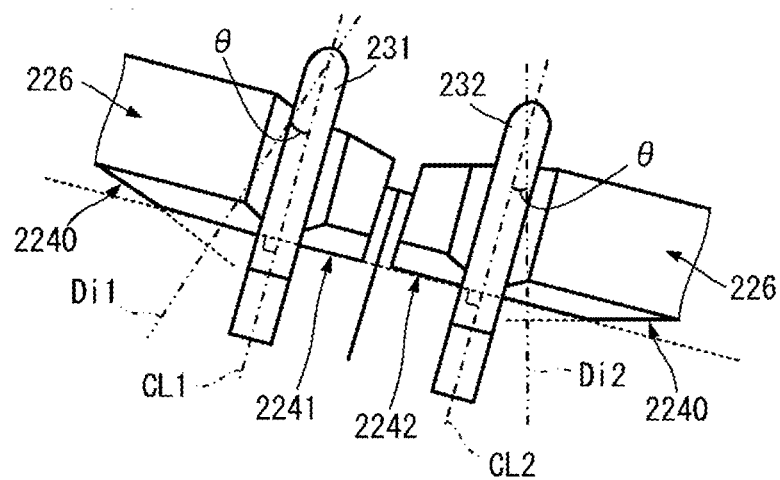
FIG. 5B is a partial enlarged view of the stator assembly in accordance with aspects of the present disclosure.

FIG. 3A is a perspective view of the stator member, and FIG. 3B is a cross-sectional view illustrating a schematic configuration of the stator member. FIG. 4A and FIG. 4B are partial enlarged views of an insulator. FIG. 5A and FIG. 5B are partial enlarged views of the stator assembly.

As described above, the stator members 20 are disposed circumferentially. The stator members 20 arranged circumferentially as described above constitute the stator assembly having an annular shape. A width direction, an axial direction, and a height direction of the stator member 20 are defined below.

The width direction of the stator member 20 is a direction parallel to a direction in which the plurality of stator members 20 are arranged in the stator member 20. The axial direction of the stator member 20 is a direction extending radially from a center of the stator assembly constituted by the stator members 20. The height direction of the stator member 20 is a direction orthogonal to the width direction and the axial direction of the stator member 20.

As illustrated in FIG. 3A and FIG. 3B, the stator member 20 includes a stator core 21, an insulator 22, and a coil 23.

The stator core 21 may be made of a magnetic material. The stator core 21 may have an outer end surface 214 and an inner end surface 215.

The stator core 21 has a columnar shape that extends in the axial direction of the stator member 20, and has a side surface parallel to an axial direction.

The outer end surface 214 is a surface at one end in the axial direction of the stator core 21. The inner end surface 215 is a surface at another end in the axial direction of the stator core 21.

The inner end surface 215 is proximate to and opposed to the magnet 43 of the rotor member 40.

The insulator 22 has insulation properties, and may be made of, for example, an insulating resin. By using the insulating resin, various shapes, as described below, may be easily and accurately implemented.

The insulator 22 may include an outer member 221, an inner member 222, and a central member 223. The central member 223 may have a substantially cylindrical shape. The outer member 221 may be connected to one end (outside) of the central member 223 in an extending direction, and the inner member 222 is connected to another end (inner side) of the central member 223 in the extending direction. When viewed in an axial direction of the center member 223, areas of the outer member 221 and the inner member 222 may be larger than an area of an outer shape of the central member 223. The insulator 22 may be divided into two members, for example, an upper member and a lower member (not labeled), and covers the stator core 21 by the upper member and the lower member. Accordingly, the central member 223 as the upper member and the central member 223 as the lower member each may have a substantially semicircular cross section.

The central member 223 may substantially cover the entire surface of a side surface of the stator core 21. The outer member 221 may be disposed in a vicinity of an outer end portion of the stator core 21. The outer end surface 214 of the stator core 21 may protrude outward compared to an end surface in the outer member 221 opposite to an end surface connected to the central member 223. The inner member 222 may be disposed in a vicinity of an inner end portion of the stator core 21. The inner end surface 215 of the stator core 21 may protrude outward compared to an end surface in the inner member 222 opposite to an end surface connected to the central member 223. With this configuration, the outer end surface 214 and the inner end surface 215 of the stator core 21 may not be covered by the insulator 22.

As illustrated in FIG. 3A, FIG. 3B, FIG. 4A, FIG. 4B, FIG. 5A and FIG. 5B, the outer member 221 has an outer end surface 224 and a surface 226. The outer end surface 224 is a surface which is parallel to a height direction and a width direction and orthogonal to an axial direction. The surface 226 is a surface which is parallel to the axial direction and the width direction and orthogonal to the height direction. Further, the outer member 221 has a first side surface and a second side surface orthogonal to the outer end surface 224 and the surface 226. The first side surface is a surface at one end in a width direction of the outer member 221, and the second side surface is a surface at another end in the width direction of the outer member 221.

The outer end surface 224 is a surface in the outer member 221 opposite to a side connected to the central member 223. The outer end surface 224, when the stator member 20 is viewed from a side of the outer end surface 224 in the axial direction, extends in the height direction compared to the outer end surface 214 of the stator core 21. For example, an end portion of the outer end surface 224 in the height direction is distanced from an end portion of the outer end surface 214 in the height direction of the stator core 21.

As illustrated in FIG. 4A, FIG. 4B, FIG. 5A and FIG. 5B, the outer end surface 224 includes a first region 2241, a central region 2240 and a second region 2242 along the width direction. The first region 2241 may be a region at one end in the width direction, and the second region 2242 may be a region at another end in the width direction. The central region 2240 may be a region between the first region 2241 and the second region 2242. The first region 2241, the central region 2240, and the second region 2242 may have respective predetermined lengths in the width direction, and the respective lengths of the first region 2241 and the second region 2242 may be substantially the same. The first region 2241 and the second region 2242 are planes.

The first region 2241 may have a planar shape that is inclined with respect to the central region 2240. In one aspect of the disclosure, an end portion on a side of one end of the outer end surface 224 in the first region 2241 may be located inside the stator member 20, with respect to an end portion on a side of the central region 2240 in the first region 2241.

The second region 2242 may have a planar shape that is inclined with respect to the central region 2240. In one aspect of the disclosure, an end portion on a side of another end of the outer end surface 224 in the second region 2242 is located inside the stator member 20, with respect to an end portion on a side of the central region 2240 in the second region 2242.

By having the first region 2241 and the second region 2242 as described above, the size of end portions of the outer member 221 in the width direction may be reduced. Accordingly, the insulator 22 may be reduced in size. Accordingly, a thickness of the stator core 21 may be reduced, and the stator member 20 may be reduced in size.

Further, in the adjacent stator members 20, the first region 2241 of a first stator member 20 and the second region 2242 of a second stator member 20 may be substantially flush. That is, in the adjacent stator members 20, the first region 2241 of the first stator member 20 and the second region 2242 of the second stator member 20 may be present on substantially the same plane.

The surface 226 may be orthogonal to the outer end surface 224. The surface 226 may be substantially parallel to an axial direction of the stator core 21. The surface 226 may also be connected to an end opposite to a side of the stator core 21 in the height direction of the outer end surface 224.

The surface 226 may include a first recess 2271 and a second recess 2272. The first recess 2271 and the second recess 2272 may each have a shape recessed from the surface 226. Each of the first recess 2271 and the second recess 2272 passes through the outer member 221 in a thickness direction. That is, each of the first recess 2271 and the second recess 2272 is open to a surface on a side of the central member 223 and the outer end surface 224 in the outer member 221.

The first recess 2271 may be disposed in a vicinity of one end in the width direction of the outer member 221. In one aspect of the disclosure, the first recess 2271 may be disposed in a portion having the first region 2241 in the outer member 221.

A width of the first recess 2271 (the length parallel to the width direction of the outer member 221) may equal to or larger than a diameter of a coil end portion 231 of the coil 23. A depth of the first recess 2271 (the length parallel to a height direction of the outer member 221) may be equal to or larger than the diameter of the coil end portion 231.

In the first recess 2271, an opening position on a side of the first region 2241 of the outer end surface 224 (corresponding to a "second end portion" in the present disclosure) may be closer to a first side surface on a side of one end of the outer member 221, than an opening position on a center side of the stator member 20 (corresponding to a "first end portion" in the present disclosure).

The second recess 2272 may be disposed in a vicinity of another end in the width direction of the outer member 221. In one aspect of the disclosure, the second recess 2272 may be disposed in a portion having the second region 2242 in the outer member 221.

A width of the second recess 2272 (the length parallel to the width direction of the outer member 221) may be equal to or larger than a diameter of a coil end portion 232 of the coil 23. A depth of the second recess 2272 (the length parallel to the height direction of the outer member 221) may be equal to or larger than the diameter of the coil end portion 232. For example, since the diameter of the coil end portion 231 and the diameter of the coil end portion 232 may be the same, the first recess 2271 and the second recess 2272 may also have the same shape.

In the second recess 2272, an opening position on a side of the second region 2242 of the outer end surface 224 (corresponding to a "fourth end portion" in the present disclosure) may be closer to a second side surface on a side of another end of the outer member 221, than an opening position on a center side of the stator member 20 (corresponding to a "third end portion" in the present disclosure).

The coil 23 may be made of a conductor having a cylindrical and linear shape. The coil 23 may include a main conductor 230, the coil end portion 231, and the coil end portion 232. The coil end portion 231 is one end of the main conductor 230, and the coil end portion 232 is another end of the main conductor 230. The coil end portion 231 corresponds to a "first coil end portion" of the present disclosure, and the coil end portion 232 corresponds to a "second coil end portion" of the present disclosure.

The main conductor 230 may be covered with an insulating film. The coil end portion 231 and the coil end portion 232 may not be covered by the insulating film. The main conductor 230 may be wound around the central member 223 of the insulator 22. In one aspect of the disclosure, the main conductor 230 may be disposed in a region surrounded by the central member 233, the outer member 221, and the inner member 222 in the insulator 22.

The coil end portion 231 and the coil end portion 232 are guided outside the stator member 20 from a side of the outer member 221 of the insulator 22. As illustrated in FIG. 4B, FIG. 5A and FIG. 5B, the coil end portion 231 may be inserted into the first recess 2271 and is guided outside from the first region 2241 of the outer end surface 224. Further, the coil end portion 232 is inserted into the second recess 2272 and is guided outside from the second region 2242 of the outer end surface 224.

With this configuration, as illustrated in FIG. 5A and FIG. 5B, a first stator member 20 and a second stator member 20 being adjacent to each other, the coil end portion 231 of the first stator member 20 and the coil end portion 232 of the second stator member 20 may be proximate to each other along a direction in which the stator members 20 are arranged.

A connection terminal, for example, a first portion 3111 and a second portion 3112 of a connection terminal 311 in FIG. 5A, of the busbar member 30, as describe below, is disposed. Thus, the coil end portion 231 and coil end portion 232 may be securely guided to a position where the connection terminal is disposed. Thus, joining of the coil end portion 231 and the coil end portion 232 and the connection terminal of the busbar member 30 may be facilitated.

Further, as described above, the first recess 2271 approaches the one end in the width direction of the outer member 221 as a distance to a tip end portion of the coil end portion 231 decreases. Accordingly, as illustrated in FIG. 5B, a direction CL1 in which the coil end portion 231 is guided forms an angle θ (θ≠0°) with respect to an axial direction Di1 (direction orthogonal to a thickness of the outer member 221). The coil end portion 231 may be guided in this way so as to approach the one end of the outer member 221 as a distance to the tip decreases.

Similarly, as described above, the second recess 2272 approaches the other end in the width direction of the outer member 221 as a distance to a tip end portion of the coil end portion 232 decreases. As illustrated in FIG. 5B, a direction CL2 in which the coil end portion 232 is guided forms the angle θ (θ≠0°) with respect to an axial direction Di2 (direction orthogonal to the thickness of the outer member 221). The coil end portion 232 is guided in this way so as to approach the other end of the outer member 221 as a distance to a tip decreases.

In this way, in a region where the adjacent first stator member 20 and the second stator member 20 are proximate and opposed to each other, the respective tip end portions of the coil end portion 231 and the coil end portion 232 may be brought closer to each other, compared to when the coil end portions are guided in parallel to a thickness direction of the outer member 221. As a result, the coil end portion 231 and the coil end portion 232 may be securely joined to each other, and reliability of the joining is improved. Further, a width of the connection terminal of the busbar member 30 disposed at this position may be reduced.

Figure 6:
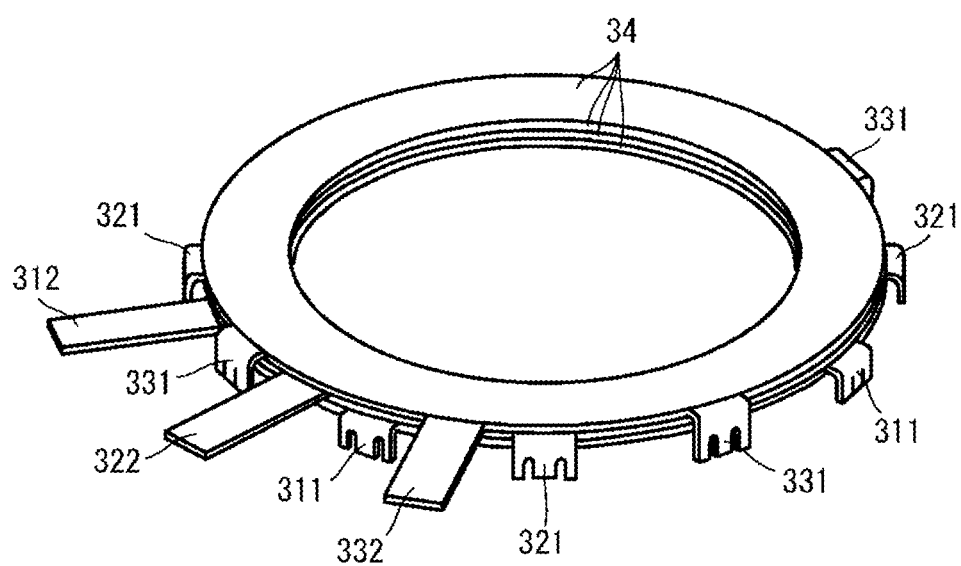
FIG. 6 is an external perspective view of a busbar member in accordance with aspects of the present disclosure.
Figure 7:
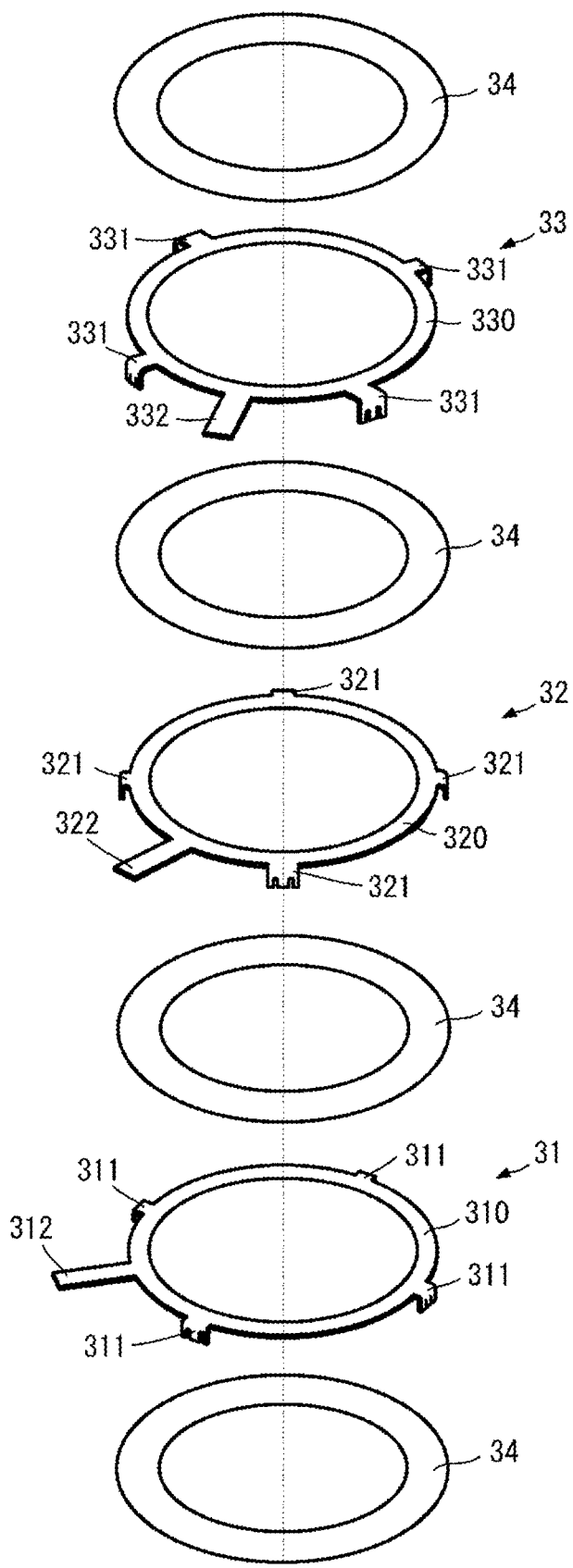
FIG. 7 is an exploded perspective view of the busbar member in accordance with aspects of the present disclosure.
Figure 8A:
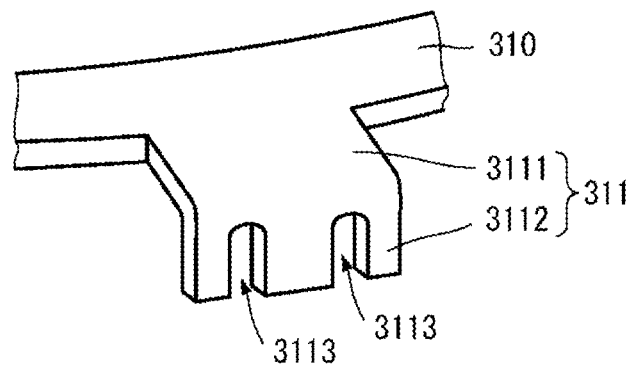
FIG. 8A is a perspective view in which a busbar terminal according to the embodiment is enlarged in accordance with aspects of the present disclosure.
Figure 8B:
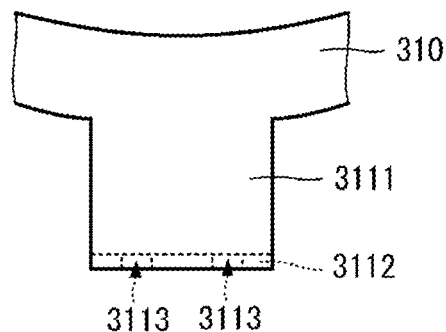
FIG. 8B is a plan view in which the busbar terminal is enlarged in accordance with aspects of the present disclosure.
Figure 8C:
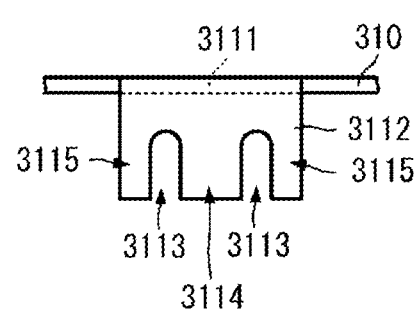
FIG. 8C is a first side view in which the busbar terminal is enlarged in accordance with aspects of the present disclosure.
Figure 8D:
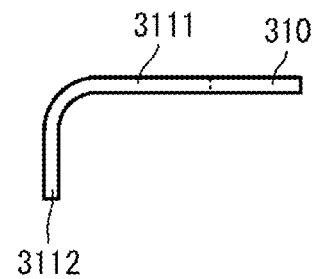
FIG. 8D is a second side view in which the busbar terminal is enlarged in accordance with aspects of the present disclosure.

FIG. 6 is an external perspective view of the busbar member according to an aspect of the disclosure. FIG. 7 is an exploded perspective view of the busbar member according to an aspect of the disclosure. FIG. 8A is a perspective view in which a busbar terminal is enlarged according to an aspect of the disclosure. FIG. 8B is a plan view in which the busbar terminal is enlarged. FIG. 8C is a first side view in which the busbar terminal is enlarged, and FIG. 8D is a second side view in which the busbar terminal is enlarged.

As illustrated in FIG. 6 and FIG. 7, the busbar member 30 includes a first busbar 31, a second busbar 32, a third busbar 33, and a plurality of insulating layers 34. Each of the first busbar 31, the second busbar 32, and the third busbar 33 are plate-like and electrically conductive. Each of the first busbar 31, the second busbar 32 and the third busbar 33 are formed to be plate-like, thus may be thin and able to flow a large current.

The first busbar 31, second busbar 32, third busbar 33, and the plurality of insulating layers 34 may be stacked in order of the insulating layer 34, the first busbar 31, the insulating layer 34, the second busbar 32, the insulating layer 34, the third busbar 33, and the insulating layer 34. It is may also be possible to omit the respective insulating layers 34 at both ends in this stacking direction, as far as insulation from the housing 50 or the like is secured.

The first busbar 31 includes a base portion 310, a plurality of connection terminals 311, and an output terminal 312. The base portion 310 has an annular shape. The connection terminals 311 may be arranged at equal distances along a circumferential direction of the base portion 310. In the examples illustrated in FIG. 6 and FIG. 7, the connection terminals 311 may be disposed at an angular distance of approximately 90° along the circumferential direction. Each of the plurality of connection terminals 311 have a shape protruding outward from an outer periphery of the base portion 310. Each of the plurality of connection terminals 311 have a width along the circumferential direction of the base portion 310. This width corresponds to a distance between the adjacent coil end portion 231 and the coil end portion 232 in the above adjacent stator members 20 (distance between the first recess 2271 and the second recess 2272). The output terminal 312 has a shape protruding outward from the outer periphery of the base portion 310. The output terminal 312 is connected to a position different from a connection position of each of the plurality of connection terminals 311 in the circumferential direction of the base portion 310.

Each of the plurality of connection terminals 311 is bent halfway in a longitudinal direction orthogonal to a width direction. In one aspect of the disclosure, as illustrated in FIG. 8A, FIG. 8B, FIG. 8C, and FIG. 8D, each of the plurality of connection terminals 311 includes the first portion 3111 and the second portion 3112. The first portion 3111 is connected to the base portion 310. An end portion of the first portion 3111 on a opposite side to a connection end portion to the base portion 310 may be connected to the second portion 3112.

The first portion 3111 may be substantially flush with the base portion 310. In one aspect of the disclosure, a main surface of the base portion 310 and a main surface of the first portion 3111 are connected to each other on the same plane. The second portion 3112 may be orthogonal to the first portion 3111. For example, a main surface of the second portion 3112 and the main surface of the first portion 3111 may be substantially orthogonal to each other.

In one aspect of the disclosure, the bending directions of the connection terminals 311 may be the same. That is, the second portions 3112 of the respective connection terminals 311 may protrude in the same direction with respect to the base portion 310.

Two connection terminal recesses 3113 may be formed in the second portion 3112 of the connection terminal 311. The two connection terminal recesses 3113 may each have a shape recessed toward a side of the first portion 3111 from an end portion opposite to an end portion connected to the first portion 3111 in a longitudinal direction of the second portion 3112.

The two connection terminal recesses 3113 may be formed so as to be spaced from each other in a width direction of the second portion 3112. A distance between the two connection terminal recesses 3113 may be substantially equal to a distance, in the stator members 20 adjacent to each other, between a position of the coil end portion 231 of a first stator member 20 and a position of the coil end portion 232 of the second stator member 20. Respective widths of the two connection terminal recesses 3113 may be equal to or larger than the respective diameters of the coil end portion 231 and the coil end portion 232.

The second busbar 32 may include a base portion 320, a plurality of connection terminals 321, and an output terminal 322. The second busbar 32 may have a structure similar to that of the first busbar 31. For example, the base portion 320 of the second busbar 32 may be similar to the base portion 310 of the first busbar 31. The plurality of connection terminals 321 of the second busbar 32 may also similar to the plurality of connection terminals 311 of the first busbar 31. However, a portion extending in a direction orthogonal to the base portion 320 in each of the plurality of connection terminals 321 is may be than a portion extending in a direction orthogonal to the base portion 310 in each of the plurality of connection terminals 311. The output terminal 322 of the second busbar 32 may also similar to the output terminal 312 of the first busbar 31.

The third busbar 33 may include a base portion 330, a plurality of connection terminals 331, and an output terminal 332. The third busbar 33 may have a structure similar to that of the first busbar 31. Specifically, the base portion 330 of the third busbar 33 may be similar to the base portion 310 of the first busbar 31. The plurality of connection terminals 331 of the third busbar 33 may also be similar to the plurality of connection terminals 311 of the first busbar 31. However, a portion extending in a direction orthogonal to the base portion 330 in each of the plurality of connection terminals 331 may be longer than the portion extending in the direction orthogonal to the base portion 310 in each of the plurality of connection terminals 311, and the portion extending in the direction orthogonal to the base portion 320 in each of the plurality of connection terminals 321. The output terminal 332 of the third busbar 33 may also be similar to the output terminal 312 of the first busbar 31.

The base portion 310 of the first busbar 31, the base portion 320 of the second busbar 32, and the base portion 330 of the third busbar 33 overlap with each other when viewed in the stacking direction.

The connection terminals of the first busbar 31, the second busbar 32, and the third busbar 33 do not overlap with each other. More specifically, the connection terminals 311 of the first busbar 31, the connection terminals 321 of the second busbar 32, and the connection terminals 331 of the third busbar 33 are disposed at equal distances in a circumferential direction of an annular shape where the base portion 310, the base portion 320, and the base portion 330 overlap with each other. At this time, the connection terminal 311 of the first busbar 31, the connection terminal 321 of the second busbar 32 and the connection terminal 331 of the third busbar 33 may be disposed in order in the circumferential direction.

The insulating layer 34 may have an annular shape. The insulating layer 34 may be made of insulating paper, and may be thinner than each of the first busbar 31, the second busbar 32, and the third busbar 33. The insulating layers 34 are disposed at least between the base portion 310 of the first busbar 31 and the base portion 320 of the second busbar 32, and between the base portion 320 of the second busbar 32 and the base portion 330 of the third busbar 33. By these insulating layers 34, insulation between the first busbar 31 and the second busbar 32, and insulation between the second busbar 32 and the third busbar 33 are secured in the busbar member 30.

Referring to FIG. 6 and FIG. 7, the base portion 310, the base portion 320, and the base portion 330 may be annular, but are not limited to be annular, as long as the base portion is looped. Additionally, in FIG. 6 and FIG. 7, although the base portion 310, the base portion 320, and the base portion 330 each have a structure in which there are no cuts in the circumferential direction, but there may be the cuts.

Figure 9:
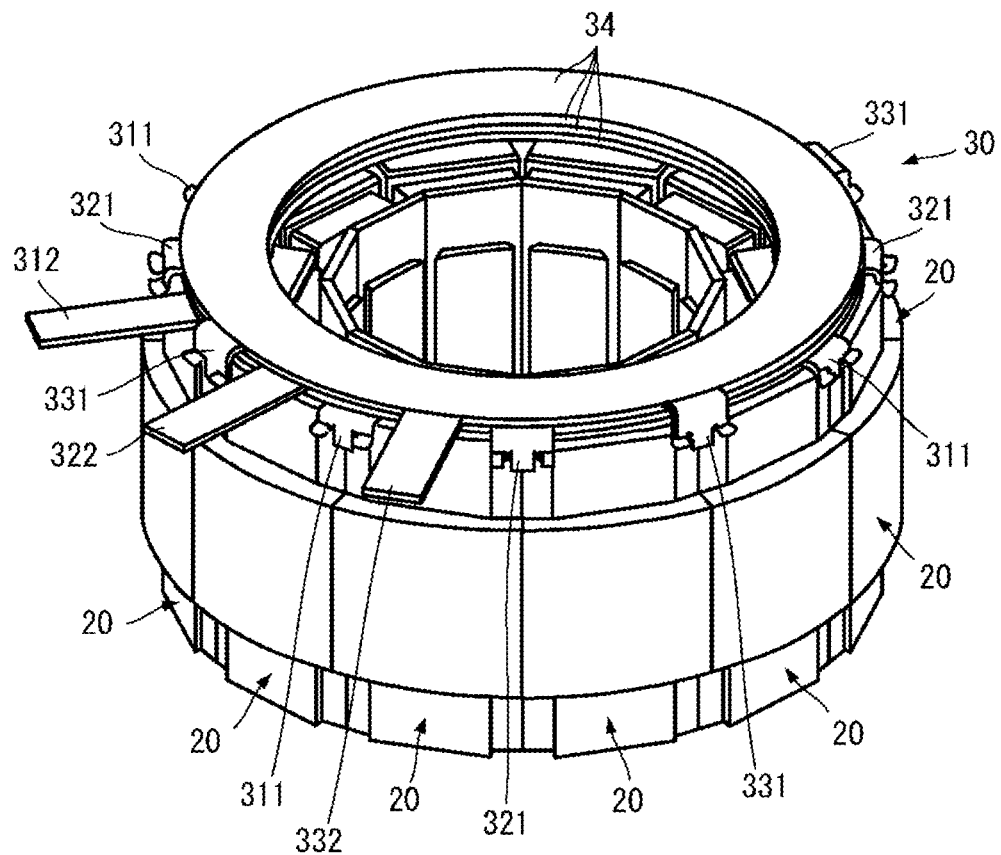
FIG. 9 is a perspective view illustrating a positional relationship between a plurality of the stator members and the busbar member in accordance with aspects of the present disclosure.
Figure 10:
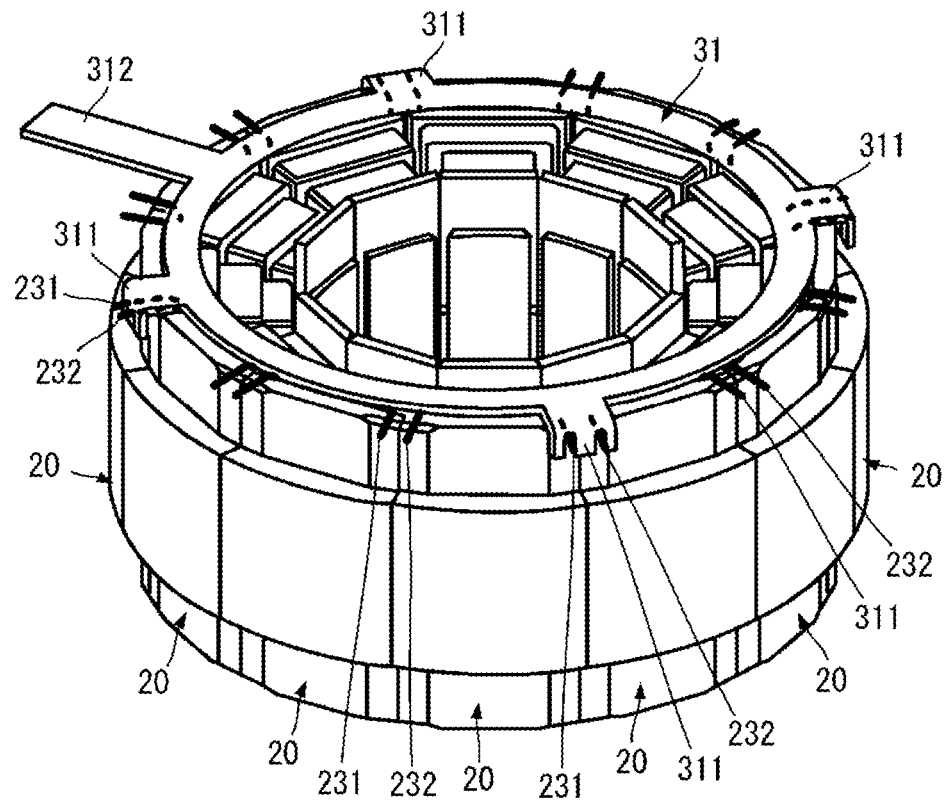
FIG. 10 is a perspective view illustrating a positional relationship between the plurality of stator members and one busbar in accordance with aspects of the present disclosure.
Figure 11:
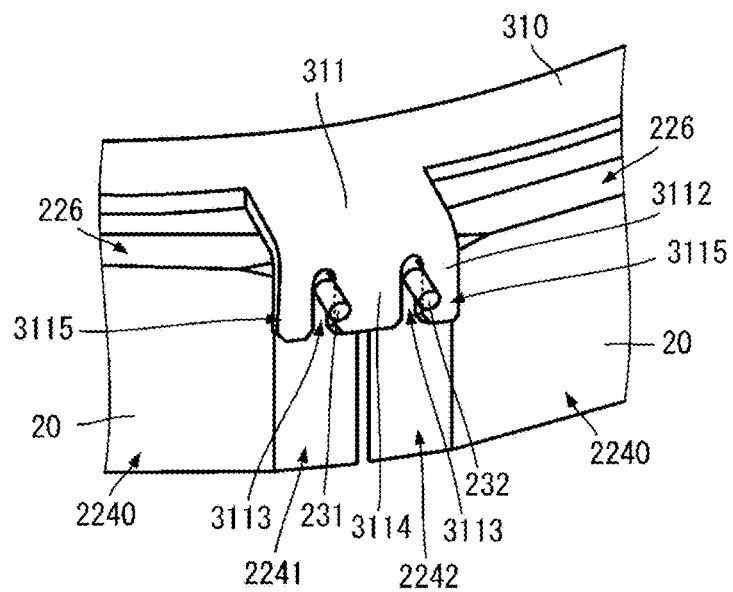
FIG. 11 is an enlarged view illustrating a positional relationship between the stator member and one busbar in accordance with aspects of the present disclosure.

FIG. 9 is a perspective view illustrating a positional relationship between the plurality of the stator members (stator assembly) and the busbar member according to an aspect of the disclosure. FIG. 10 is a perspective view illustrating a positional relationship between the plurality of stator members and one busbar according to an aspect of the disclosure. FIG. 11 is an enlarged view illustrating a positional relationship between the stator member and one busbar according to an aspect of the disclosure.

As illustrated in FIG. 9 and FIG. 10, the busbar member 30 is disposed with respect to the plurality of stator members 20 such that the second portion 3112 of the connection terminal 311, the second portion of the connection terminal 321, and the second portion of the connection terminal 331 are on a side of the stator members 20. Each of the connection terminals 311, 321, and 331 are disposed so as to overlap with respective opposed portions of the adjacent stator members 20. Further, each of the connection terminals 311, 321, and 331 are disposed so as to face the first region 2241 and the second region 2242 of the respective outer end surfaces 224 which are proximate to each other, in the insulators 22 of the respective stator members 20 adjacent to each other.

As described above, the first region 2241 and the second region 2242 which are proximate to each other, may be on the same plane. For example, the first region 2241 and the second region 2242 form one plane. Further, for example, in a case of the connection terminal 311, an inner surface of the second portion 3112 is parallel to this plane. Then, a substantially entire surface of the inner surface of the second portion 3112 abuts on the first region 2241 and the second region 2242.

Thus, positioning of the busbar member 30 with respect to the plurality of stator members 20 may be facilitated by using the connection terminal 311, the connection terminal 321, and the connection terminal 331.

The coil end portion 231 and the coil end portion 232 of the respective adjacent stator members 20 may be inserted into either the two connection terminal recesses 3113 of the connection terminal 311, the two connection terminal recesses 3113 of the connection terminals 321, or the two connection terminal recesses 3113 of the connection terminals 331, respectively. For example, as illustrated in FIG. 11, the coil end portion 231 and coil end portion 232 of the respective adjacent stator members 20 are inserted into the respective two connection terminal recesses 3113 of the connection terminal 311.

A distance between the coil end portion 231 and the coil end portion 232 and a distance between the two connection terminal recesses 3113 may be substantially the same. Thus, the coil end portion 231 and the coil end portion 232 of the respective adjacent stator members 20 may be easily inserted into the two connection terminal recesses 3113 of the connection terminal 311, respectively.

Thus, when the coil end portion 231 and the coil end portion 232 are joined to the connection terminal 331, an operator does not have to draw the coil end portion 231 and the coil end portion 232 so that the coil end portion 231 and the coil end portion 232 are brought closer to the connection terminal 331. Thus, the operator can easily join the coils 23 of the stator members 20 and the busbar member 30.

Additionally, the width of the connection terminal recess 3113 may be equal to or larger than the respective diameters of the coil end portion 231 and the coil end portion 232. Thereby, when the busbar member 30 is attached to the plurality of stator members 20, the operator can easily insert the coil end portion 231 and the coil end portion 232 into the respective connection terminal recesses 3113. Thus, the busbar member 30 is disposed with respect to the plurality of stator members 20, in a state where the coil end portion 231, the coil end portion 232, and the busbar member 30 can be easily joined to each other.

Additionally, a depth of the connection terminal recess 3113 may be equal to or larger than the respective diameters of the coil end portion 231 and the coil end portion 232. Accordingly, each of the coil end portion 231 and the coil end portion 232 is accommodated in the connection terminal recess 3113 without protruding outward the connection terminal recess 3113 from an opening at a tip end side of the second portion 3112. Thus, the coil end portion 231 and the coil end portion 232 are hardly detached from the respective connection terminal recesses 3113. Further, with this structure, joining using a tongue portion 3115, as described below, will be facilitated.

Figure 12A:
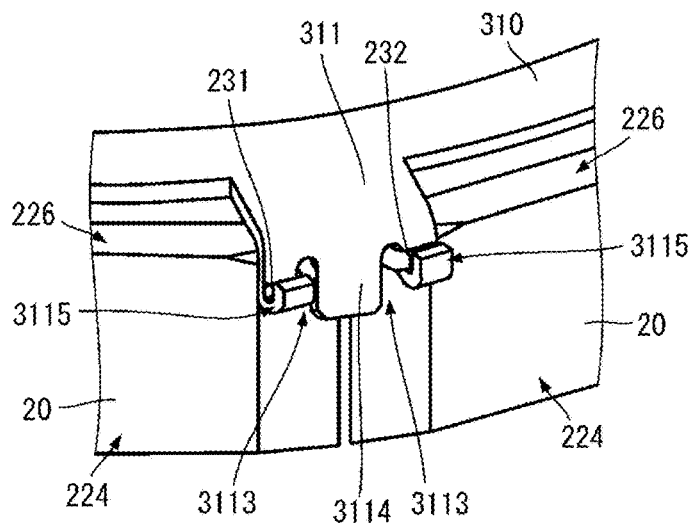
FIG. 12A is an enlarged view illustrating a joining aspect between coil end portions and a connection terminal in accordance with aspects of the present disclosure.
Figure 12B:
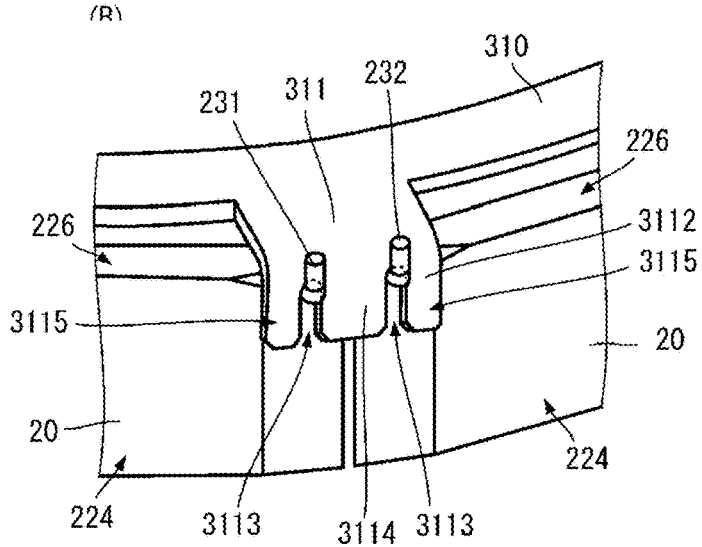
FIG. 12B is an enlarged view illustrating a joining aspect between coil end portions and a connection terminal in accordance with aspects of the present disclosure.

FIG. 12A and FIG. 12B are enlarged views each illustrating a joining aspect between the coil end portions and the connection terminal. The aspect illustrated in FIG. 12A is obtained by enlarging the joining aspect illustrated in FIG. 9. The aspect illustrated in FIG. 12B illustrates an example of an aspect different from that illustrated in FIG. 12A. Further, FIG. 12A and FIG. 12B each illustrate a joining aspect of the coil end portion 231, the coil end portion 232, and the first busbar 31. However, a joining aspect of the coil end portion 231 and the coil end portion 232, and the second busbar 32 or the third busbar 33 may be similar to that in the case of the first busbar 31.

In the aspect of the disclosure illustrated in FIG. 12A and FIG. 9, each of the coil end portion 231 and the coil end portion 232 are bent in the width direction of the second portion 3112 from a thickness direction of the second portion 3112.

The coil end portion 231 may be bent toward an opposite side to the adjacent stator member 20, along the outer end surface 224 of the insulator 22 of the stator member 20 having the coil end portion 231. Alternatively, the coil end portion 232 may be bent toward an opposite side to the adjacent stator member 20, along the outer end surface 224 of the insulator 22 of the stator member 20 having the coil end portion 232.

A bent portion for each of the coil end portion 231 and the coil end portion 232 is provided in a portion where the connection terminal recess 3113 opens to a side of the main surface of the second portion 3112.

As illustrated in FIG. 12A and FIG. 11, the second portion 3112 may be provided with one tongue portion 3114 and two tongue portions 3115. The tongue portion 3114 may be disposed at a center in the width direction of the second portion 3112, and the two tongue portions 3115 may be disposed at respective ends in the width direction of the second portion 3112. The tongue portion 3114 and the tongue portion 3115 may be adjacent to each other and separated by the connection terminal recess 3113.

The tongue portion 3115 on one side may overlap with the coil end portion 231. The tongue portion 3115 on another side may overlap with the coil end portion 232.

The tongue portion 3115 on the one side may be bent, and this bent structure covers an outer periphery of the coil end portion 231. The bent tongue portion 3115 and the coil end portion 231 may be fixed by fusing, soldering, laser welding, or the like. Thus, the coil end portion 231 and the connection terminal 311 may be joined to each other.

The tongue portion 3115 on the other side may be bent, and this bent structure covers an outer periphery of the coil end portion 232. The bent tongue portion 3115 and the coil end portion 232 may be fixed by fusing, soldering, laser welding, or the like. Thus, the coil end portion 232 and the connection terminal 311 may be joined to each other.

As illustrated in FIG. 12B, the coil end portion 231 and the coil end portion 232 are bent in the longitudinal direction of the second portion 3112 of the connection terminal 311, and toward a side of the first portion 3111. The coil end portion 231 and the coil end portion 232 and the second portion 3112 may be fixed by fusing, soldering, laser welding, or the like. Thus, the coil end portion 231 and the coil end portion 232 and the connection terminal 311 may be joined to each other.

Figure 13:
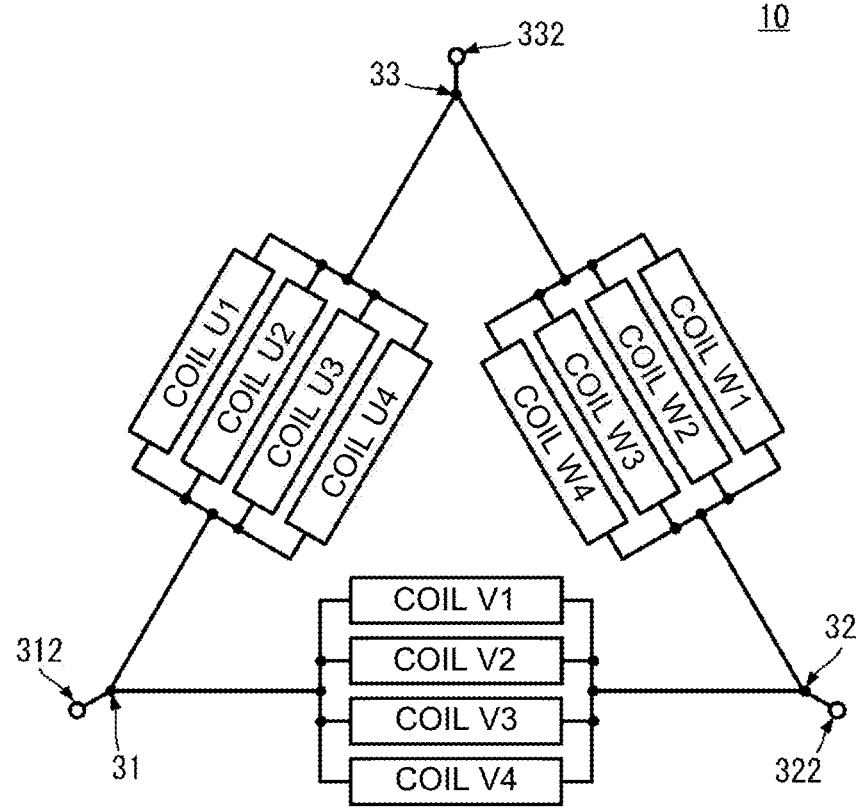
FIG. 13 is an equivalent circuit diagram of the motor in accordance with aspects of the present disclosure.

Further, with the structure described above, the motor 10 having a circuit configuration illustrated in FIG. 13 is implemented. FIG. 13 is an equivalent circuit diagram of the motor according to an aspect of the disclosure.

As illustrated in FIG. 13, the motor 10 may include a U-phase coil, a V-phase coil, and a W-phase coil. The U-phase coil has a circuit configuration in which a coil U1, a coil U2, a coil U3, and a coil U4 are connected in parallel. The V-phase coil has a circuit configuration in which a coil V1, a coil V2, a coil V3, and a coil V4 are connected in parallel. The W-phase coil has a circuit configuration in which a coil W1, a coil W2, a coil W3, and a coil W4 are connected in parallel to each other.

One end of the U-phase coil is connected to one end of the V-phase coil. Another end of the V-phase coil is connected to one end of the W-phase coil. Another end of the W-phase coil is connected to another end of the U-phase coil. That is, the U-phase coil, the V-phase coil, and the W-phase coil are connected to each other in delta connection.

Each of the coils U1, U2, U3, U4, V1, V2, V3, V4, W1, W2, W3, and W4 are implemented by the stator member 20, as described above. A connection portion connecting the U-phase coil and the V-phase coil may be implemented by, for example, the first busbar 31 described above. A connection portion connecting the V-phase coil and the W-phase coil may be implemented by, for example, the second busbar 32, as described above. A connection portion connecting the W-phase coil and the U-phase coil may be implemented by, for example, the third busbar 33, as described above. Three output sections of the delta connection are implemented by the output terminal 312 of the first busbar 31, the output terminal 322 of the second busbar 32, and the output terminal 332 of the third busbar 33, respectively.

In the configuration, as described above, each of the connection terminal 311 of the first busbar 31, the connection terminal 321 of the second busbar 32, and the connection terminal 331 of the third busbar 33 are bent toward a side of the plurality of stator members 20, in an axial direction. Further, the second portion 3112 of the connection terminal 311 of the first busbar 31, the second portion of the connection terminal 321 of the second busbar 32, and the second portion of the connection terminal 331 of the third busbar 33 overlap with the insulators 22 of the plurality of stator members 20 in the axial direction. For example, when a side surface of the motor 10 is viewed (viewed in a direction orthogonal to the axial direction), the respective second portions of the connection terminal 311 of the first busbar 31, the connection terminal 321 of the second busbar 32, and the connection terminal 331 of the third busbar 33 overlap with the insulators 22 of the plurality of stator members 20. In each of these second portions, the connection terminal may be connected to the coil end portion 231 and coil end portion 232 of the stator members 20.

Accordingly, a size of a portion of the motor 10 in the axial direction including the busbar member 30 and the plurality of stator members 20 is, only a thickness obtained by adding a thickness of a stacking portion of the base portion 310 of the first busbar 31, the base portion 320 of the second busbar 32, the base portion 330 of the third busbar 33, and the plurality of the insulating layers 34 in the busbar member 30, and a size of the stator member 20 in the axial direction. For example, the size of the portion of the motor 10 in the axial direction including the busbar member 30 and the plurality of stator members 20 may not be affected by respective sizes of the connection terminal 311, the connection terminal 321, and the connection terminal 331. Thus, a shape of the portion including the busbar member 30 and the plurality of stator members 20 may be reduced. Thus, the motor 10 may be reduced in shape without lowering output thereof.

Further, as illustrated in FIG. 1, FIG. 9, and FIG. 10, the respective second portions of the connection terminal 311, the connection terminal 321, and the connection terminal 331 may be disposed closer to a center axis side than the end surface 214 of the stator core 21. Thus, a dimension in a direction orthogonal to the axis is not increased. Thus, the motor 10 may also be reduced in shape in the direction orthogonal to the axis while the output is maintained.

Further, as an example, as illustrated in FIG. 11, each of the second portions of the connection terminal 311, the connection terminal 321, and the connection terminal 331 abuts on the outer end surface 224 of the outer member 221 of the insulator 22. These abutments may be used for positioning when the busbar member 30 is placed on the plurality of stator members 20. Thus, assembly of the motor 10 may be facilitated.

Further, as described above, the recesses may be formed in the second portion of each of the connection terminal 311, the connection terminal 321, and the connection terminal 331, and the coil end portions may be inserted into the recesses. This facilitates positioning and joining of the connection terminal 311, the connection terminal 321, and the connection terminal 331 and the plurality of coil end portions. Thus, the assembly of the motor 10 may be further facilitated.

Further, as illustrated in FIG. 12A, the coil end portions may be fused in a state of being covered with the respective tongue portions 3115 of the second portion. Thus, reliability of the joining between the coil end portion and the second portion is improved. Furthermore, a jig for fusing does not directly contact the coil end portion. Thus, a film in a vicinity of the coil end portion is hardly attached to the jig for fusing. Thus, management of a fusing process may be facilitated, and fixing is performed by fusing, soldering, laser welding, or the like. Maintenance of the jig for fusing is facilitated.

The tongue portions 3115 may be formed by having the two connection terminal recesses 3113 through which the coil end portion 231 and the coil end portion 232 are inserted, respectively. Thus, the tongue portion 3115 may be formed even when a notch or the like for forming the tongue 3115 is not formed in the second portion 3112.

Further, as described above, the coil end portions 231 and coil end portions 232 of the plurality of stator members 20 may be securely guided to respective positions where the connection terminal 311, the connection terminal 321, and the connection terminal 331 of the busbar member 30 are disposed. Thus, joining of the coil end portions 231 and the coil end portions 232 of the plurality of stator members 20, and the connection terminal 311, the connection terminal 321 and the connection terminal 331 of the busbar member 30 is facilitated.

Further, as described above, a distance between respective tips of the coil end portion 231 and the coil end portion 232 which are adjacent to each other may be shortened. Thus, joining of the coil end portion 231 and the coil end portion 232 is facilitated, and reliability of the joining is improved. Further, respective widths of the connection terminal 311, the connection terminal 321, and the connection terminal 331 may be reduced.

Further, as described above, both ends of the insulator 22 in a width direction may be reduced in size. Thus, the stator member 20 may be reduced in size, and thus the motor 10 may be reduced in size.

Figure 14:
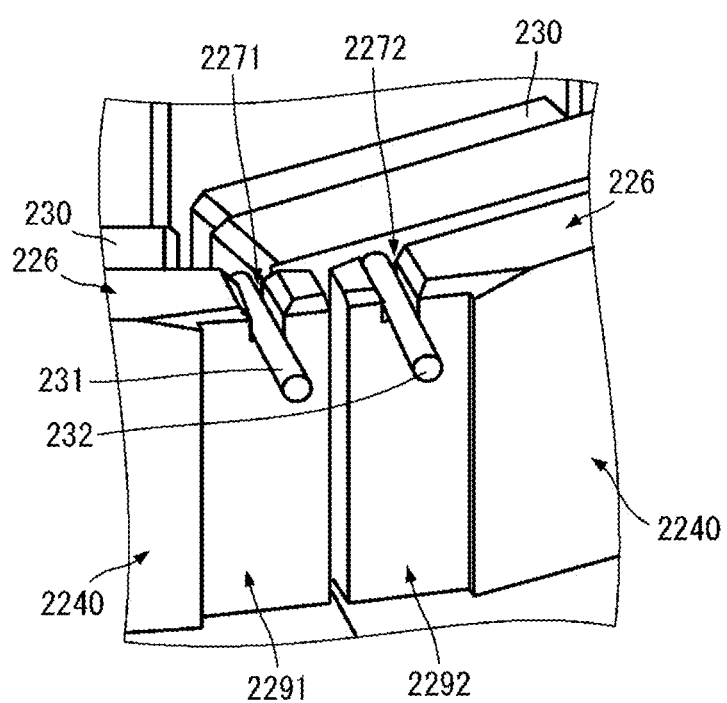
FIG. 14 is an enlarged view illustrating the stator member in accordance with aspects of the present disclosure.

FIG. 14 is an enlarged view illustrating an aspect of the stator member. The stator member illustrated in FIG. 14 differs from the stator member 20 described above in that respective portions corresponding to the first region 2241 and the second region 2242 are recessed inward. The rest of configurations of the stator member illustrated in FIG. 14 may be similar to those of the stator member 20, as described above.

The outer member 221 of the insulator 22 includes a first region 2291 and a second region 2292. The first region 2291 may be inclined with respect to the central region 2240, and is recessed as a whole, in a thickness direction of the outer member 221. Similarly, the second region 2292 may be inclined with respect to the central region 2240, and is recessed as a whole, in the thickness direction of the outer member 221.

A depth to which the first region 2291 is recessed and a depth to which the second region 2292 is recessed may be set as appropriate, but are substantially the same as a thickness of the second portion of the connection terminal of the busbar member 30, for example.

In this configuration, the second portion of the connection terminal of the busbar member 30 may be fitted into a recess formed by the first region 2291 and the second region 2292. Thus, the busbar member 30 is easily positioned with respect to the plurality of stator members 20.

Figure 15A:
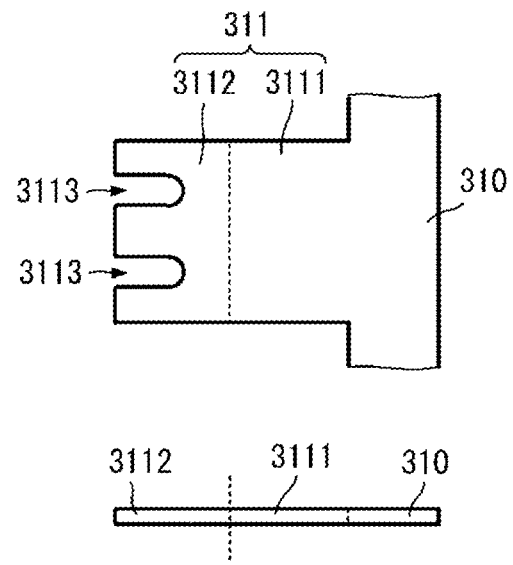
FIG. 15A is a two-view drawing illustrating the connection terminal of the busbar in accordance with aspects of the present disclosure.
Figure 15B:
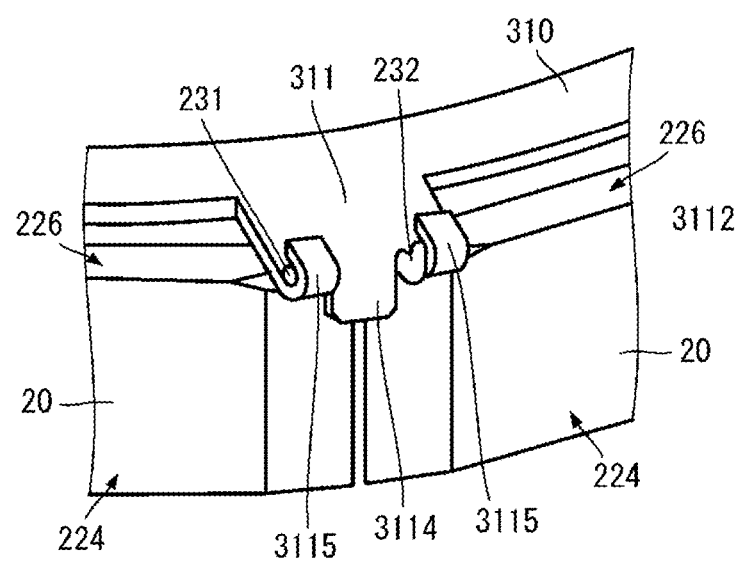
FIG. 15B is a diagram illustrating a joining in structure in FIG. 15A in accordance with aspects of the present disclosure.
Figure 16A:
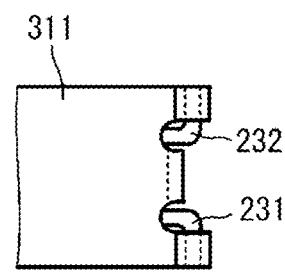
FIG. 16A is a partial plan view illustrating a joining in the structure in FIG. 15A in accordance with aspects of the present disclosure.
Figure 16B:
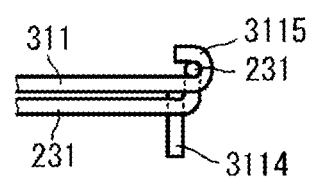
FIG. 16B is a partial side view illustrating a joining in the structure in FIG. 15A in accordance with aspects of the present disclosure.
Figure 16C:
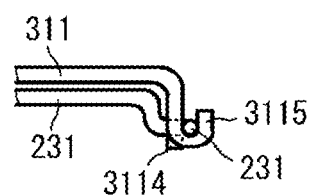
FIG. 16C is a side view illustrating a state in which a joining point is bent toward a side of the stator assembly in accordance with aspects of the present disclosure.

FIG. 15A is a two-view drawing illustrating another aspect of the connection terminal of the busbar, and FIG. 15B is a diagram illustrating a joining aspect in structure in FIG. 15A. FIG. 16A is a partial plan view illustrating the joining aspect in the structure in FIG. 15A. FIG. 16B is a partial side view illustrating the joining aspect in the structure in FIG. 15A. FIG. 16C is a side view illustrating a state in which a joining portion is bent toward a side of the stator assembly.

In the connection terminal 311 illustrated in FIG. 15A, the second portion 3112 and the first portion 3111 are connected to each other so as to be straight. For example, the connection terminal 311 does not have a portion bent halfway in a longitudinal direction.

In such a configuration, as illustrated in FIG. 15B, FIG. 16A, and FIG. 16B, the coil end portion 231 and the coil end portion 232 may be bent to a direction orthogonal to the main surface of the second portion 3112, and are bent so as to extend in the width direction of the second portion 3112. The coil end portion 231 and the coil end portion 232 may be fixed by fusing, soldering, laser welding, or the like, in a state of being covered by the respective tongue portions 3115. As illustrated in FIG. 15B, the tongue portion 3114 is bent to a direction orthogonal to the main surface of the first portion 3111.

Further, as illustrated in FIG. 16C, after joining, the coil end portion 231, the coil end portion 232, and the respective tongue portions 3115 may be bent toward a side of the stator assembly. Accordingly, a length in an axial direction of a structure including the stator assembly and the busbar member 30 may be reduced.

Even when the busbar member is configured as described above, by using the configuration of the stator member 20 described above, the respective positions of the coil end portion 231 and the coil end portion 232 overlap with the corresponding connection terminal recesses 3113 of the second portion 3112, when viewed in a direction in which the busbar member and the plurality of stator members 20 are aligned. Therefore, the joining of the coil end portion 231 and the coil end portion 232 and the connection terminal 311 is facilitated.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A stator comprising:
a stator core configured with a shape extending along an axial direction and having a side surface extending in the axial direction;
an insulator disposed adjacent to the side surface of the stator core; and
a coil having a linear shape configured to wound around the side surface of the stator core with the insulator interposed therebetween, the coil comprising a first coil end and a second coil end each having a liner shape, wherein
the insulator comprises a central member covering the side surface of the stator core, and an outer member connected to the central member in the axial direction,
the outer member comprises a first recess and a second recess, wherein the first coil end is configured to be inserted into the first recess, and the second coil end is configured to be inserted into the second recess, and
the outer member further comprises an outer end surface on a side opposite to a side of the central member, with the outer end surface including a bevel.

2. The stator of claim 1, wherein a direction in which the central member and the outer member are arranged being a thickness direction.

3. The stator according to claim 2, wherein
the first recess is disposed at a first end of the outer member in a width direction orthogonal to the thickness direction, and
the second recess is disposed at a second end of the outer member in the width direction.

4. The stator according to claim 3, wherein
the outer member further comprises a first side surface orthogonal to the outer end surface and forming one side of the outer member in the width direction,
the first recess has a first end portion on the side of the central member, and a second end portion on the side of the outer end surface, and
the second end portion is disposed so as to be closer to the first side surface than the first end portion.

5. The stator according to claim 4, wherein
the outer member has a second side surface orthogonal to the outer end surface, on an opposite side to the first side surface in the width direction,
the second recess has a third end portion on the side of the central member, and a fourth end portion on the side of the outer end surface, and
the fourth end portion is disposed so as to be closer to the second side surface than the third end portion.

6. The stator according to claim 5, wherein the bevel on the outer end surface comprises:
a first bevel on a side of the one end of the outer member, including a position at which the first recess is exposed,
a second bevel on a side of another end of the outer member, including a position at which the second recess is exposed, and
a central region between the first bevel and the second bevel in the width direction.

7. The stator according to claim 6, wherein
the first bevel has a planar shape and is inclined with respect to the central region such that an end on the side of the one end is located inside the stator relative to an end on the side of the central region, and
the second bevel has a planar shape and is inclined with respect to the central region such that an end on the side of another end is located inside the stator relative to an end on the side of the central region.

8. A stator assembly comprising:
a first stator member and a second stator member are adjacent to each other, wherein each of the first stator member and the second stator member comprise:
a stator core configured with a shape extending along an axial direction and having a side surface extending in the axial direction;
an insulator configured to be disposed adjacent to the side surface of the stator core; and
a coil having a linear shape configured to wound around the side surface of the stator core with the insulator interposed therebetween, the coil comprising a first coil end and a second coil end each having a liner shape, wherein
the insulator comprises a central member covering the side surface of the stator core, and an outer member connected to the central member in the axial direction,
the outer member comprises a first recess and a second recess wherein the first coil end is configured to be inserted into the first recess, and the second coil end is configured to be inserted into the second recess,
wherein a direction in which the central member and the outer member are arranged being a thickness direction,
the first recess is disposed at a first end of the outer member in a width direction orthogonal to the thickness direction,
the second recess is disposed at a second end of the outer member in the width direction, wherein the first stator member and the second stator member are disposed in an annular shape,
one end in the width direction of the outer member of the first stator member, and one end in the width direction of the outer member of the second stator member are opposed and proximate to each other, and
the outer member further comprises an outer end surface on a side opposite to a side of the central member, with the outer end surface including a bevel.

9. The stator assembly of claim 8, further comprising a rotor member disposed in a central opening of the stator assembly, and having an axis orthogonal to an opening surface; and
a busbar disposed so as to be proximate to the stator assembly along a direction in which the axis of the rotor member extends.

10. The stator assembly of claim 9, wherein the busbar comprises a base portion in an annular shape, and a connection terminal in a plate shape connected to the base portion, and connected to the first coil end of the first stator member and the second coil end of the second stator member.

11. The stator assembly of claim 10, wherein the connection terminal is disposed so as to overlap with a portion where the first stator member and the second stator member are proximate and opposed to each other, and comprises a connection terminal recess that is proximate to the first recess and the second recess, and passes through the connection terminal in a thickness direction, and
each of the first coil end of the first stator member and the second coil end of the second stator member is configured to be inserted into the connection terminal recess.

12. The stator assembly of claim 11, wherein the connection terminal further comprises
a first portion connected to the base portion, and having a main surface parallel to the base portion, and
a second portion connected to the first portion, and having a main surface orthogonal to the main surface of the first portion, and
the main surface of the second portion is parallel to the outer end surface of the outer member adjacent to the main surface of the second portion.

* * * * *